(12) United States Patent
Vignoli

(10) Patent No.: US 6,453,971 B2
(45) Date of Patent: Sep. 24, 2002

(54) TOOL FOR MOUNTING AND REMOVING TYRES ONTO AND FROM RESPECTIVE WHEEL RIMS

(75) Inventor: Giuliano Vignoli, Modena (IT)

(73) Assignee: Societa Italiana Costruzioni Elettromeccaniche - S.I.C.E.-S.p.A., Correggio (IT)

(*) Notice: Subject to any disclaimer, the term of this patent is extended or adjusted under 35 U.S.C. 154(b) by 0 days.

(21) Appl. No.: 09/884,154

(22) Filed: Jun. 20, 2001

(30) Foreign Application Priority Data

Jun. 20, 2000 (IT) ................................. RE2000A000066

(51) Int. Cl.[7] ........................................... B60C 25/135
(52) U.S. Cl. ..................................... 157/1.22; 157/1.24
(58) Field of Search ............................. 157/1.17, 1.22, 157/1.24, 1.28, 1.3, 1.42

(56) References Cited

U.S. PATENT DOCUMENTS 5,752,555 A * 5/1998 Cunningham et al. ..... 157/1.24
5,941,294 A * 8/1999 Cunningham et al. ..... 157/1.24

* cited by examiner

Primary Examiner—Joseph J. Hail, III
Assistant Examiner—David B. Thomas
(74) Attorney, Agent, or Firm—Browdy and Neimark (57) ABSTRACT

A tool for mounting and removing tires onto and from respective wheel rims comprises a profiled body mounted on a cylindrical shank provided at the end of a tool holder bar associated with a tire removal machine. The body has two active portions: the blade and the head. The blade and the head extend from two parts comprising coaxial hubs, both of which are mounted on the cylindrical shank of the tool holder bar and removably coupled together such that their mutual orientations can be adjusted. At least one of the hubs is provided with means for torsionally locking the hub to the shank.

10 Claims, 14 Drawing Sheets

TOOL FOR MOUNTING AND REMOVING TYRES ONTO AND FROM RESPECTIVE WHEEL RIMS

FIELD OF THE INVENTION

This invention relates to a tool for inserting and extracting tire beads into and from their retention seats of respective wheel rims while fully respecting the integrity of said beads whatever the nominal diameter of said wheel rims.

BACKGROUND OF THE INVENTION

Modern tire removal machines, typically for automobile and other light vehicle wheels and for motorcycle wheels, are known to comprise, inter alia, a usually horizontal self-centering unit provided for locking the wheel rims, and an overlying tool for mounting and removing the respective tires, this acting between the bead retention edge of the wheel rim and the tire bead.

This tool can be adjusted both vertically and horizontally, in order to adapt its operating position to wheel rims of different widths and diameters.

In particular, this tool is supported by a vertical bar slidable in height and supported by a horizontal arm which is slidingly mounted on the top of a column situated behind the self-centering unit.

More specifically, the tool consists of an elongate profiled one-piece body to be positioned transversely to the bar, and comprising two active portions positioned on one and the other side of the bar.

One of the active portions is formed in practice as a blade or tongue intended to lie virtually coplanar with the upper bead retention edge of the wheel rim locked on the self-centering unit, the other presenting a substantially hemispherical head intended to lie facing the bead retention edge and presenting a jutting protuberance situated on the opposite side to that occupied by the blade or tongue.

The purpose of the protuberance is to provide the support and turning region for the usual bead lifting levers used by tire operators in disengaging the beads from the bead retention seats on the respective wheel rims.

As stated, these known tools are in the form of a one-piece body, which has proved unsatisfactory for the following reasons.

In this respect, as modern vehicle and motorcycle wheel rims can have considerably different nominal diameters, the one-piece tool construction means that the tongue or the protuberance on known tools often assumes an operating position relative to the wheel rim which is displaced from the optimum required for easy and correct extraction and insertion of the respective tire beads.

With particular reference to the extraction of a bead from the respective edge of its wheel rim, the optimum position of the tool relative to the wheel rim is that in which the support protuberance for the bead lifting lever is practically parallel to the straight line tangential to that region of the bead retention edge which is close to the protuberance, the blade passing beyond the bead retention edge by a distance of the same order of magnitude as the radial dimension of the bead.

Known tools can occupy an operating position close to the aforedefined optimum for only a part of the range of possible nominal wheel rim diameters, for example medium-large and large diameters, whereas their operating position deviates from the optimum even by a large extent for other diameters within the range, for example intermediate and small diameters.

In particular, if the tool is not correctly positioned relative to a circle of relatively small diameter, the respective protuberance is inclined outwards from the straight line tangential to that region of the bead retention edge behind the protuberance, and the blade extends beyond the end of the bead retention edge by a distance which is relatively large compared with that for wheel rims of intermediate and relatively large nominal diameters.

This inclination of the protuberance results in a corresponding distancing of the respective support region for the bead lifting lever away from the bead retention edge of the wheel rim, thus creating a problem when the bead has to be lifted onto the hemispherical head of the tool to arrange it for extraction.

In this respect, seeing that the inclination of the protuberance increases the distance of its free end from the bead retention edge, and that in order to lift the bead onto the head by the bead lifting lever the bead has to pass beyond the free end of the protuberance, the bead must be deformed to a greater extent than would occur if the protuberance were correctly positioned as aforestated.

In addition to requiring considerable force by the tire operator, this can subject the bead to problems and/or excessive stress, with possible damage such as stretching, local weakening and cracking.

Other possible local damage can also derive from the settling of the bead lifting lever, in particular from the oscillation to which the lever is subjected when, starting from its transverse orientation defined by the wedging of its end between the bead and the respective bead retention edge, it is pulled with force against the protuberance, which as stated is inclined to the tangent passing through that portion of the bead retention edge situated at the protuberance.

These problems assume particular importance for tubeless tires.

Moreover, at the moment the upper bead is extracted from the respective bead retention edge of a wheel rim of relatively small diameter, where as stated the blade extends beyond the end of said bead retention edge by a relatively large distance, the free edge of the blade can interfere with the sidewall of the tire, with consequent inconvenient rubbing between the two during rotation of the self-centering unit.

Consequently, with the self-centering unit in movement similar rubbing also occurs between the sidewall of the tire and the blade during insertion of the lower bead, and between the sidewall and the free end of the protuberance during extraction of the lower bead.

In an attempt to overcome this problem, certain parties, including the Applicant, have proposed tools, again consisting of a one-piece body shaped as specified in the introduction, which are intended to be positioned at the end of a vertical bar such that their angular position can be adjusted.

In particular, these tools comprise an intermediate tube to be mounted as an exact fit on a lower cylindrical end shank of said bar, and be locked thereat by suitable means, such as a ring nut or the like.

In addition, the shank is provided with a surface flattening, and with two transverse adjacent through screws the points of which make contact with said surface flattening.

To swivel the tool in one direction or the other, one of said screws has firstly to be loosened and then the other screwed tightly down.

However this solution has also proved unsatisfactory at least for the following two reasons.

The first is the fact that the loosening and tightening operations are relatively lengthy and complicated.

The second is the fact that as the tool is in one piece, its two opposing active portions cannot be independently adjusted, with the result that when one of them is positioned correctly, the other can occupy an inconvenient position.

Essentially, if the protuberance is positioned virtually parallel to the tangent passing through that part of the circle close to the protuberance, the blade can project excessively from the end of the bead retention edge, and if the blade is positioned to pass beyond the end by a distance of the same order of magnitude as the radial dimension of the bead, the protuberance can be inconveniently inclined to the tangent, with the aforegoing drawbacks.

In this specific sector there is therefore a widely felt need for a tool which is able to overcome the aforesaid problem, without having to use two or more tire removal machines each having a tool suitable for a specific part of the range of current nominal wheel rim diameters.

SUMMARY OF THE INVENTION

The main object of the present invention is precisely to satisfy said requirement within the context of a simple, rational, economical, reliable and durable construction.

This object is attained by the characteristics indicated in the claims.

In a general sense, this object is attained by providing a tool in the form of a system of variable shape, which can be adjusted as required on the basis of the nominal diameter of the wheel rim which at that moment is locked on the self-centering unit of a tire removal machine.

In particular, as will be more apparent hereinafter, it comprises two parts, of which one carries the blade and the other supports the head with its protuberance, these being provided with two coaxial annular elements or hubs which are mounted on the cylindrical end shank of the tool holder bar, and are stably coupled together such that their mutual orientation can be adjusted.

At least one of the parts can be torsionally locked to the shank, with the desired orientation.

By means of the aforesaid solution all the objects of the invention are attained, as will be apparent hereinafter.

BRIEF DESCRIPTION OF THE DRAWINGS

The constructional characteristics and merits of the invention will be apparent from the ensuing detailed description given with reference to the figures of the accompanying drawings which illustrate some particular preferred embodiments thereof by way of non-limiting example.

DETAILED DESCRIPTION OF THE INVENTION

From the figures it can be seen that the tool in question is intended to be positioned on the lower end of a usual height-adjustable vertical prismatic bar 1 positioned above a likewise usual self-centering unit (not shown) of a tire removal machine.

The bar can be adjusted in known manner not only in height, but also radially about the vertical axis (indicated by 100 in FIGS. 3 to 5) about which the self-centering unit rotates.

At the lower end of the bar 1 there is a cylindrical shank 2 for receiving the tool of the invention as a precise fit.

In all the illustrated embodiments the tool comprises two parts 20 and 22, comprising two coaxial hubs 200 and 220 to be mounted on the shank 2, on which they lie between the shoulder at the top of the shank 2 and a washer 3 which is fixed to the end of the shank 2 by a screw 4.

Said two hubs 200 and 220 are not clamped tightly against each other between the shoulder and the washer 3, but instead are simply maintained in mutual contact such as to enable them to be rotated about the longitudinal axis of the bar 1 without requiring particular force.

The part 20 comprises a first active portion, of usual type indicated by 5 in the figures, hereinafter known as the blade or tongue as stated in the introduction, and the part 22 is provided with a second active portion, also of usual type, comprising a hemispherical head 6 which rests on an idle conical roller 7, and carries a jutting protuberance 8.

Figure 1:
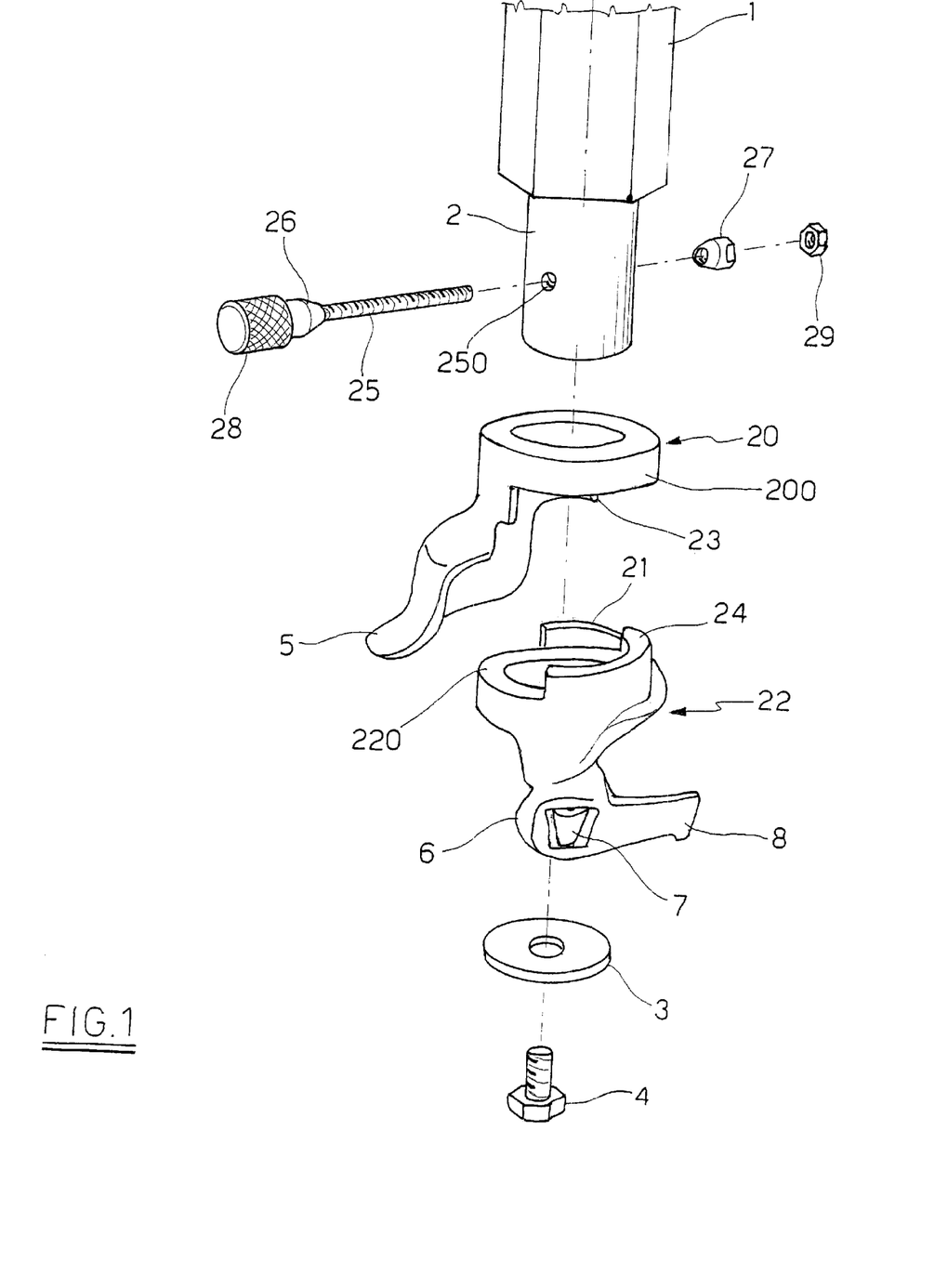
FIG. 1 is an exploded perspective view showing a first embodiment of the invention.
Figure 2:
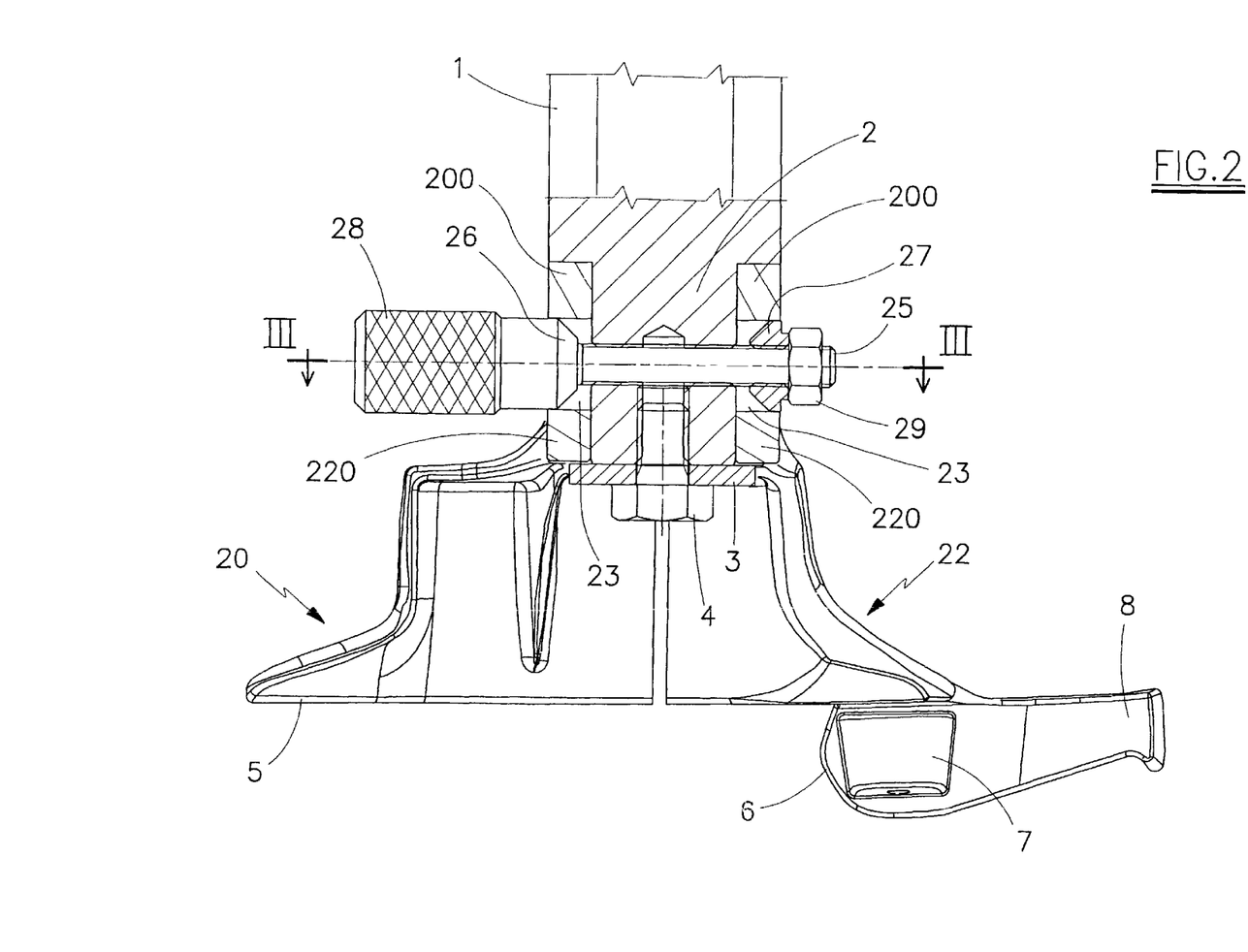
FIG. 2 is a sectional rear (with reference to its active portions) elevation showing the tool of FIG. 3 in an assembled configuration.
Figure 3:
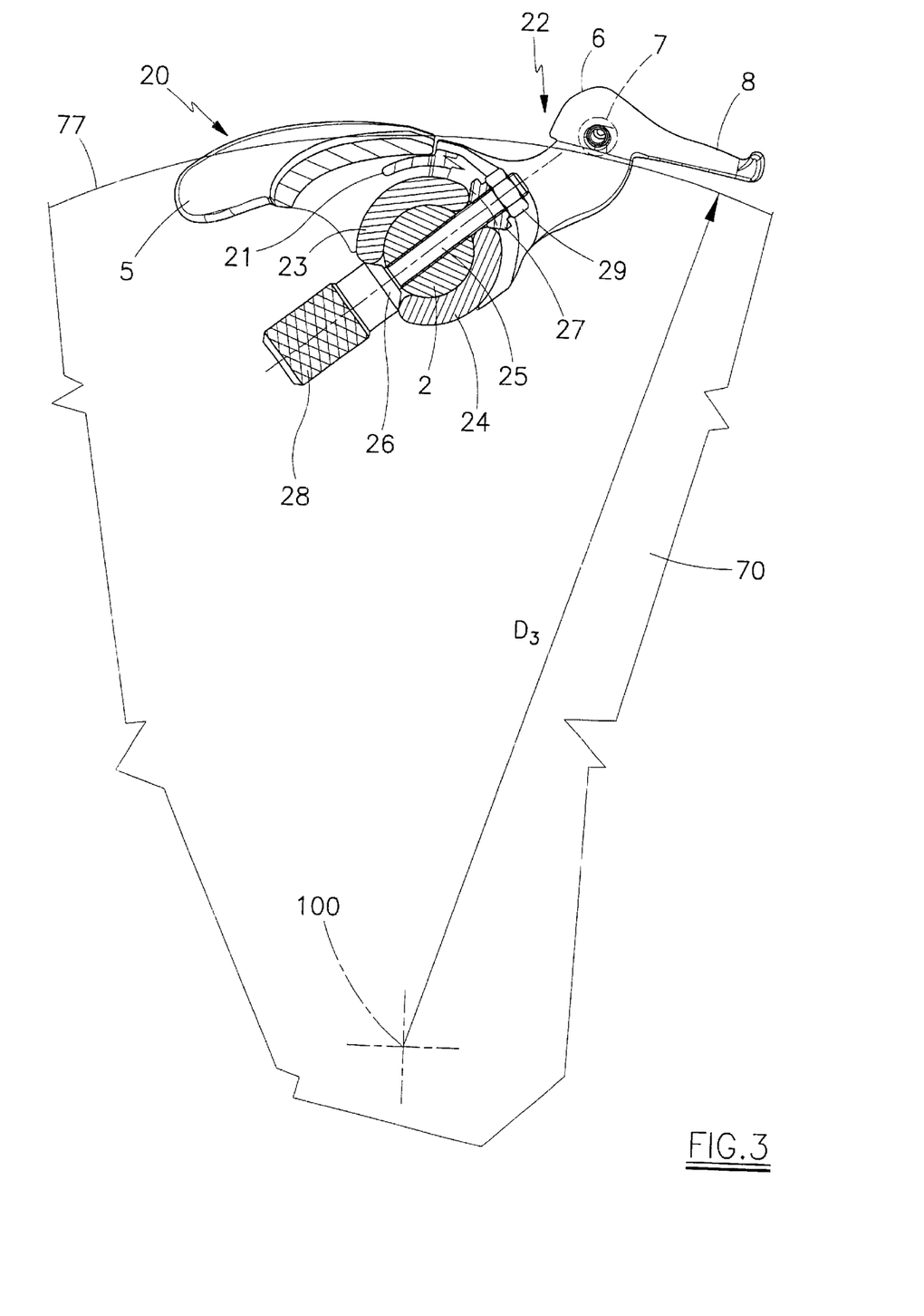
FIG. 3 is a section on the line III—III of FIG. 2 on a smaller scale, in which the tool is shown in the configuration suitable for operating on wheel rims having a relatively large nominal diameter.
Figure 4:
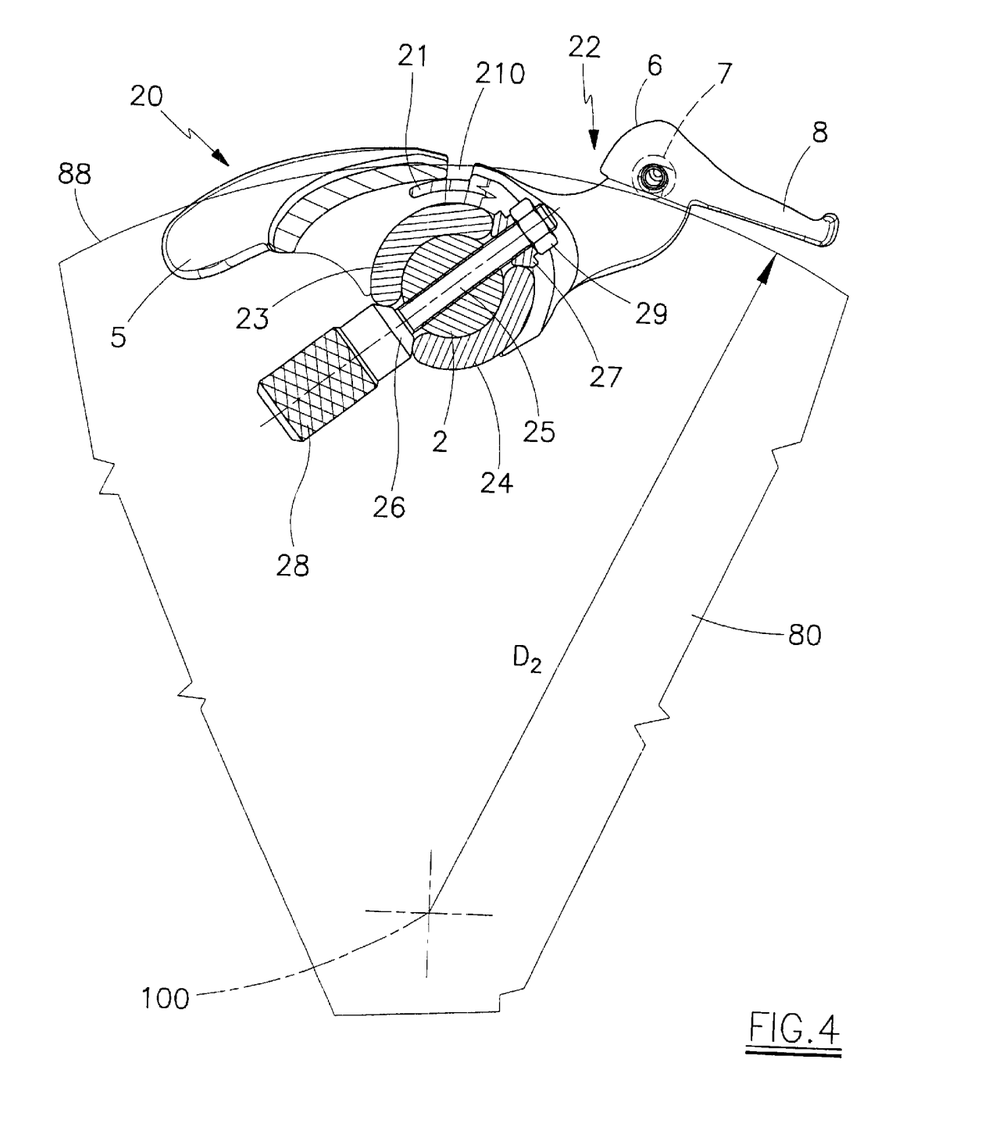
FIG. 4 is a view similar to the preceding, showing the tool in the configuration suitable for wheel rims of intermediate nominal diameter.
Figure 5:
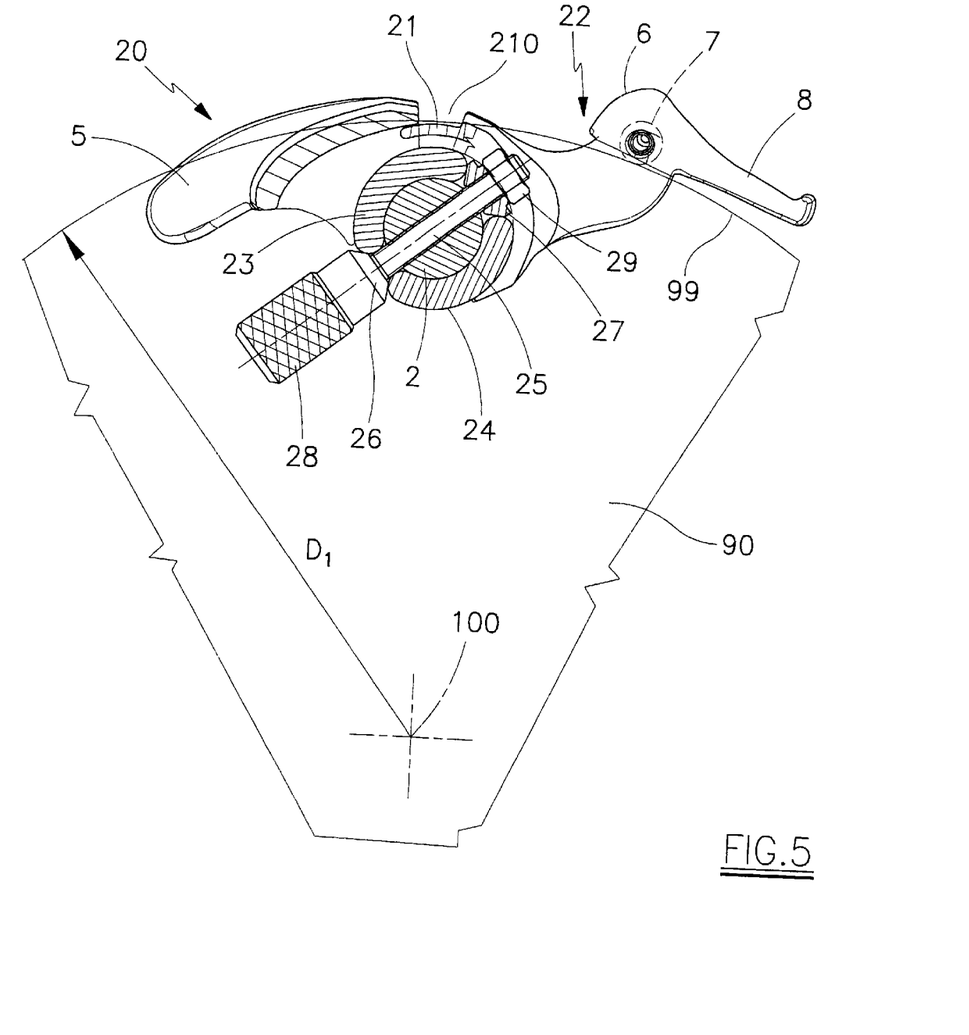
FIG. 5 is a view similar to FIGS. 3 and 4, showing the tool in the configuration suitable for wheel rims of relatively small nominal diameter.
Figure 6:
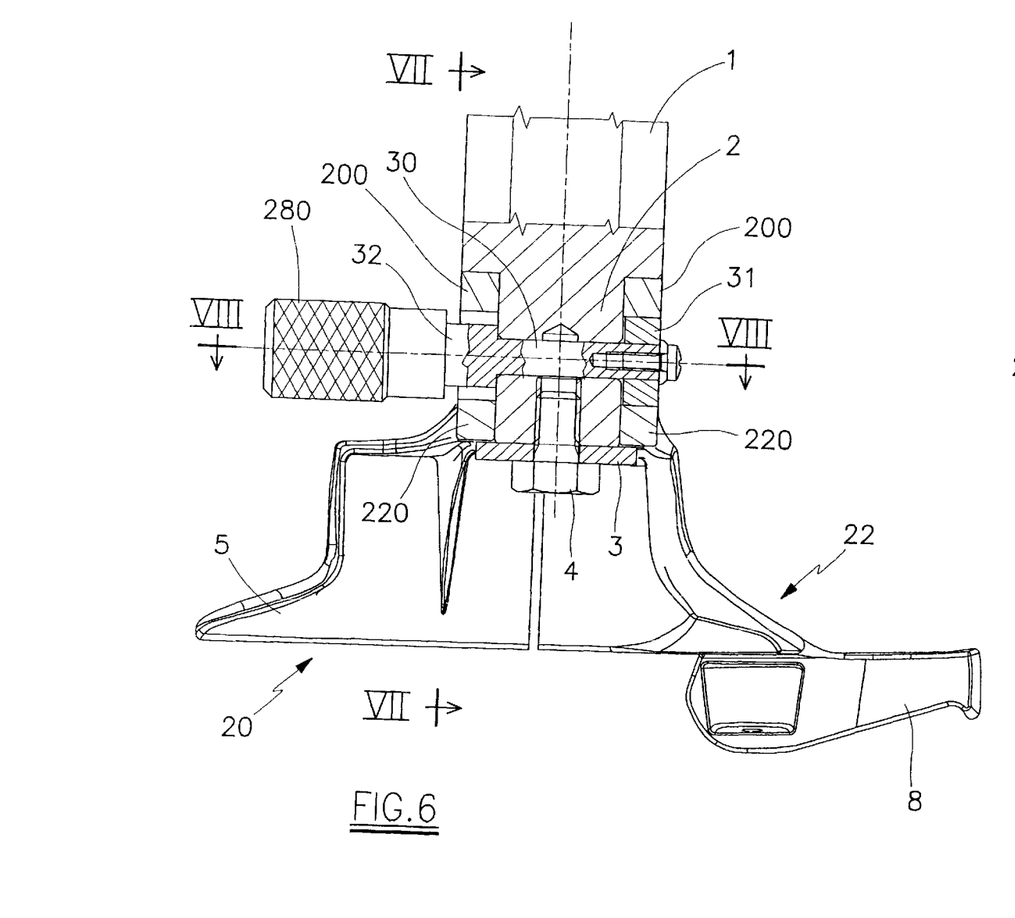
FIG. 6 is a sectional rear elevation showing a second embodiment of the invention.
Figure 7:
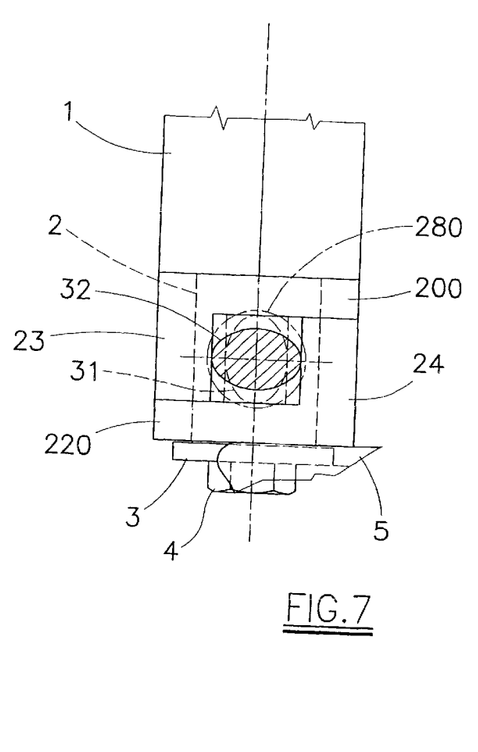
FIG. 7 is a part of the section on the line VII—VII of FIG. 6.

The function of the tongue 5, head 6, roller 7 and protuberance 8 is known. It is sufficient to note that on withdrawing or inserting a tire bead these are positioned as stated in the introduction and as shown in FIGS. 3 to 5, which in practice are schematic plan views of a self-centering unit of vertical axis 100.

According to a first embodiment, the angular positions of the two parts 20 and 22 of the tool can be adjusted relative to the shank 2 in the manner of a compass.

For this purpose, from the facing circumferential edges of the hubs 200 and 220 there extend two portions in the form of a cylindrical segment of less than 180° extension, said segments being indicated by 23 and 24 respectively. Portions 23 and 24 have the same height so that between their facing sides there are defined two gaps for receiving the control unit which will now be described.

This comprises a threaded rod 25 which is screwed into a through diametrical threaded hole 250 provided in the shank 2, and passes through the gaps between the sides.

On the opposite ends of the threaded rod 25 there are a first 26 and a second 27 thrust cone, the minor bases of which face the shank 2, their inclined surfaces making constant contact with the vertical edges of the gaps (see FIGS. 3 to 5).

Rod 25 presents a knurled operating knob 28 and a locking nut 29.

On rotating the rod 25 in one direction or the other it undergoes a corresponding axial movement (see FIGS. 3 to 5) by which one cone, such as 27, becomes increasingly inserted between the respective facing sides of the portions 23 and 24, the opposing thrust cone, such as 26, withdraws from the opposite facing sides.

Simultaneously the two parts 20 and 22 of the tool rotate in one direction or the other about the shank 2 through the same angle but in opposite directions.

By this means, the tire operator can adapt the shape of the tool to the nominal diameter of the wheel rim onto or from which the tire is to be mounted or removed, as shown in FIGS. 3 to 5.

In FIG. 3 the reference numerals 70 and 77 indicate a wheel rim of relatively large nominal diameter $D_3$, and the respective upper bead retention edge; in FIG. 4, the reference numerals 80 and 88 indicate a wheel rim of average nominal diameter $D_2$, and the respective upper bead retention edge; and in FIG. 5 the reference numerals 90 and 99 indicate a wheel rim of relatively small nominal diameter $D_1$, and the respective upper bead retention edge.

There is also provided an arched apron 21 (see FIGS. 1 and 3–5) which is rigid with the part 22, its purpose being to close the lateral gap 210 formed between the two parts 20 and 22 (see FIGS. 4 and 5) to prevent entry of the foreign bodies between them.

By means of said adjustment, the tool blade 5 and protuberance 8 can be disposed in the most convenient position for extracting or inserting a bead, and in particular the protuberance 8 can be disposed practically tangential to the bead retention edge 77 or 88 or 99, and the outer free edge of the blade 5 can be positioned such that it passes beyond the end of said bead retention edge 77 or 88 or 99 by a distance of the same order of magnitude as the radial dimension of the bead.

According to the second embodiment shown in FIGS. 6 to 9, the angular position of the tool parts 20 and 22 is adjusted by the following means.

These comprise a spindle 30 which is rotatably mounted in a through diametrical hole provided in the shank 2, and presents a knurled end knob 280 for its operation.

The spindle 30 carries two identical elliptical plugs 31 and 32 which are offset by 90° and are received within the gaps defined by the pairs of facing sides of the already described portions 23 and 24.

The facing faces of said two plugs 31 and 32 are spaced apart by a distance practically equal to the diameter of the shank 2, so that the spindle 30 is locked in the axial direction.

Figure 8:
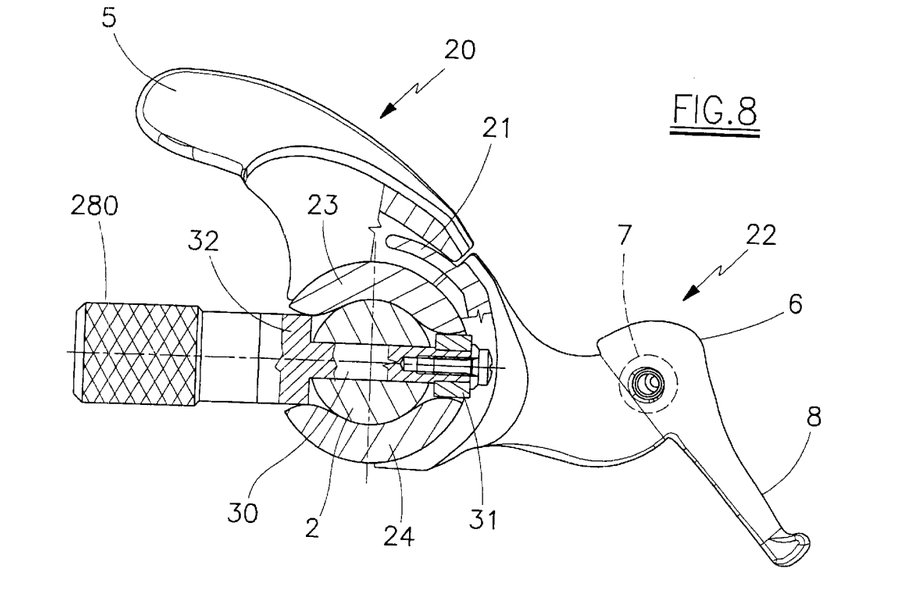
FIG. 8 is a section on the line VIII—VIII of FIG. 6 showing the tool in the configuration suitable for wheel rims of relatively large nominal diameter.
Figure 9:
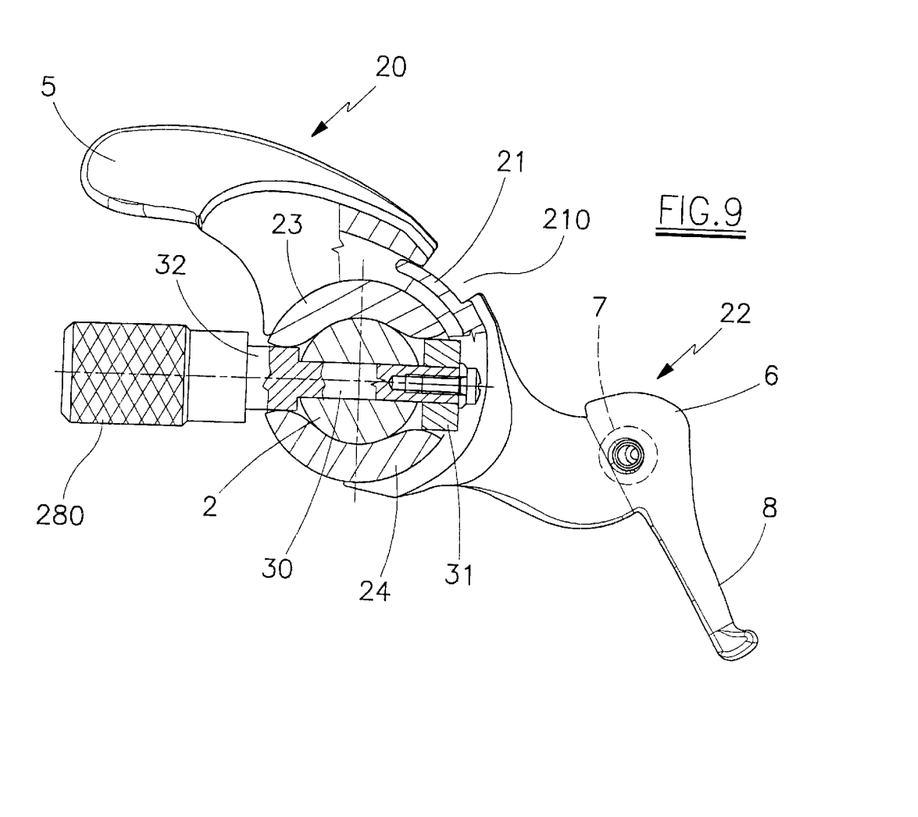
FIG. 9 is a view similar to the preceding, showing the tool in configuration suitable for wheel rims of relatively small nominal diameter.

Rotation of the spindle 30 in one direction or the other results in simultaneous rotation in opposite directions of the two tool parts 20 and 22, which can assume any position between the two shown in FIGS. 8 and 9, which correspond to those shown in FIGS. 3 and 5 respectively.

Figures 10, 11:
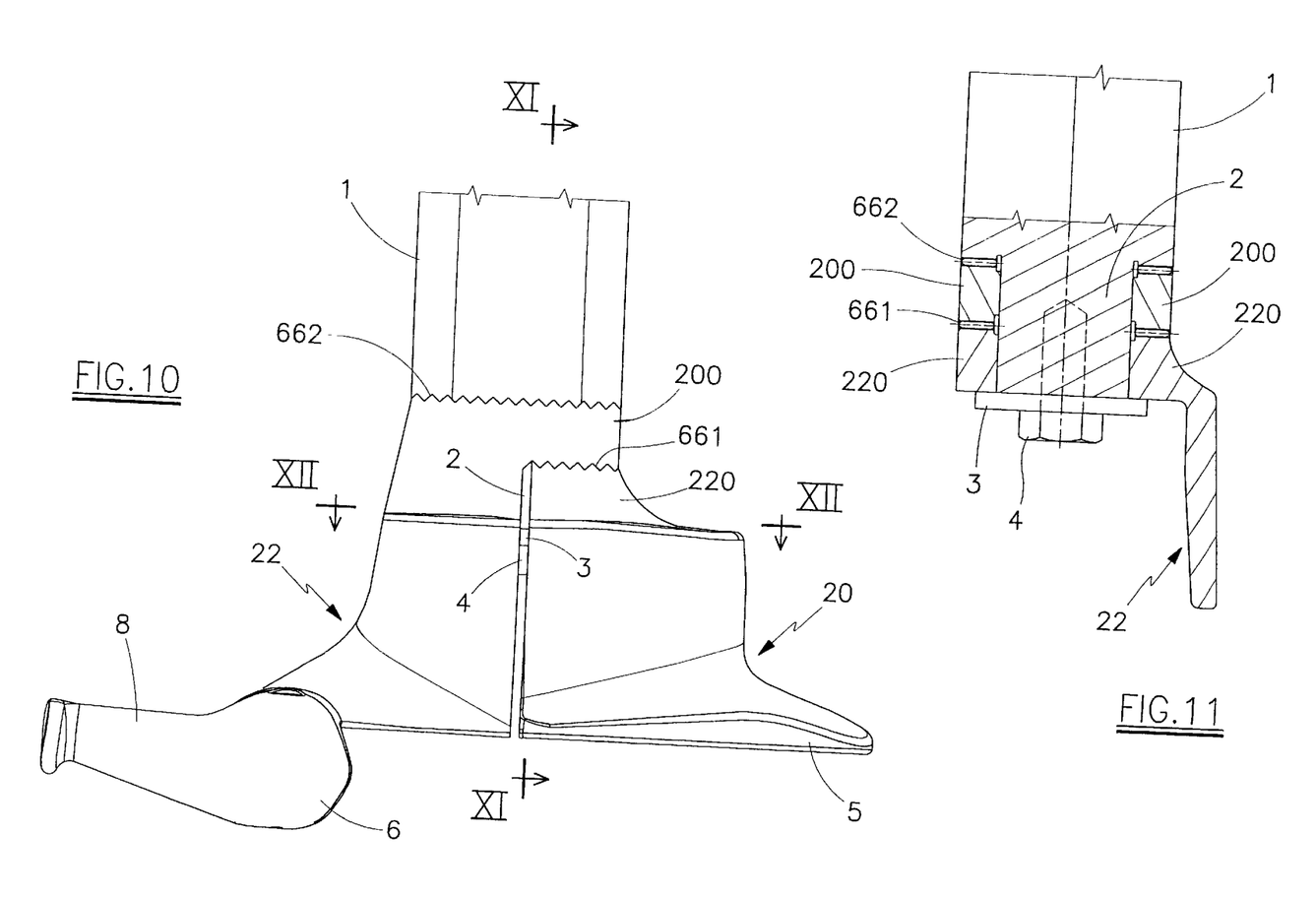
FIG. 10 is a front elevation of a third embodiment of the invention.
FIG. 11 is a section on the line XI—XI of FIG. 10.
Figure 12:
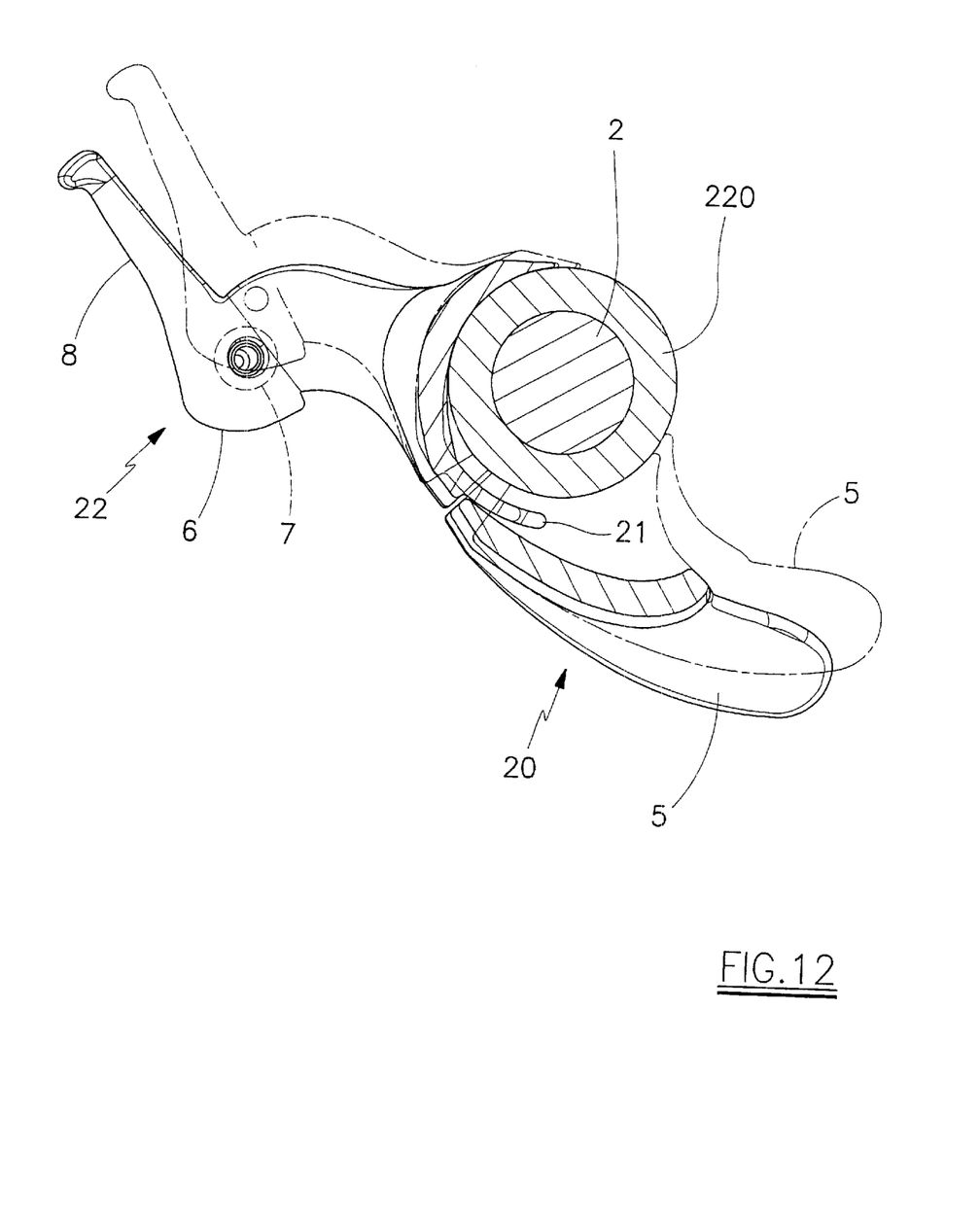
FIG. 12 is a section on the line XII—XII of FIG. 10, in which the tool is shown in the configurations suitable for relatively large diameter wheel rims and relatively small diameter wheel rims by full lines and dashed and dotted lines respectively.
Figures 13, 14:
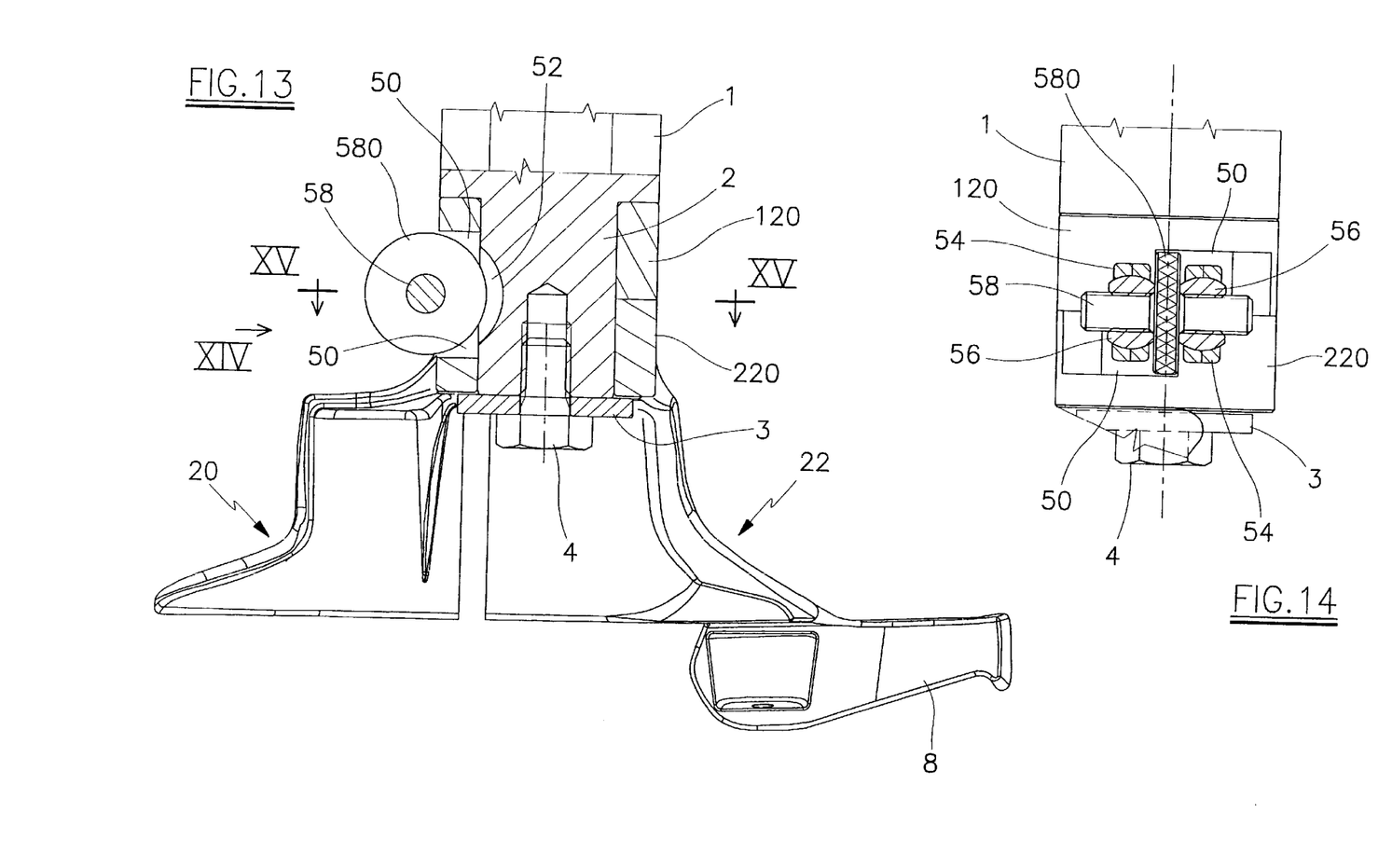
FIG. 13 is a sectional rear elevation showing a fourth embodiment of the invention.
FIG. 14 is a partial view in the direction XIV of FIG. 13.
Figure 15:
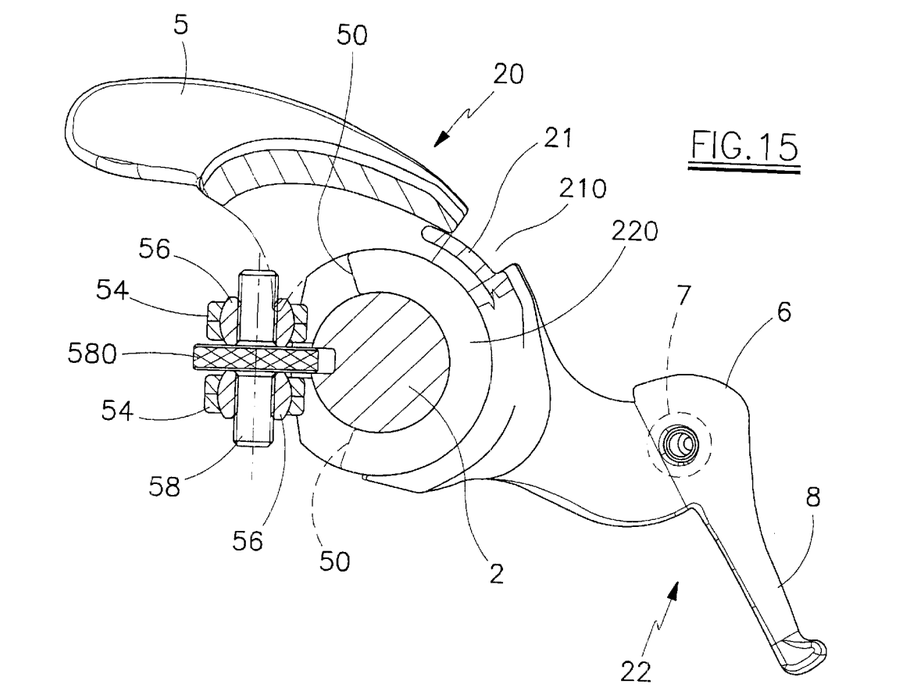
FIG. 15 is a section on the line XV—XV of FIG. 13 showing the tool in the configuration suitable for wheel rims of relatively large nominal diameter.
Figure 16:
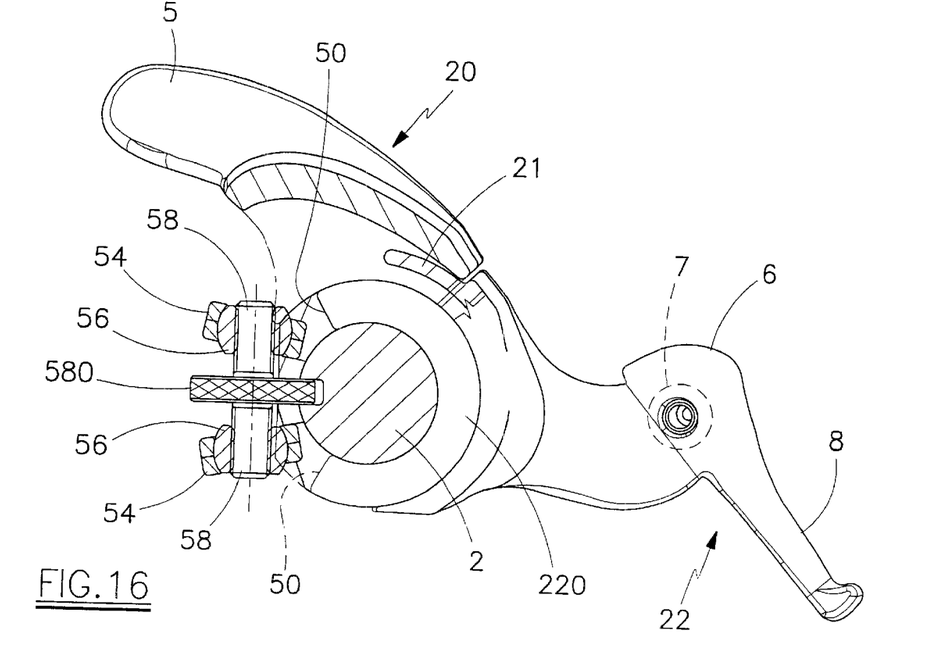
FIG. 16 is a view similar to the preceding, showing the tool in the configuration suitable for wheel rims of relatively small nominal diameter.

According to the third embodiment shown in FIGS. 10, 11 and 12, the two tool parts 20 and 22 can be adjusted relative to each other and to the bar 1 independently.

As shown in FIG. 11, the washer 3, fixed by the screw 4, is provided at the lower end of the shank 2. The hubs 200 and 220 of the tool parts 20 and 22 are mounted on the shank 2.

In this version the portions 23 and 24 are missing, whereas the lower edge of the bar 1, both edges of the hub 200 and the upper edge of the hub 220 are provided with matching teeth indicated by 661 and 662 respectively.

To adjust the angular position of one or both the tool parts 20 and 22 the screw 4 is slackened by a sufficient amount, then one or other or both the tool parts 20 and 22 are rotated by the desired amount, and finally the screw is again tightened.

In FIG. 12 the tool is shown in its configuration for wheel rims of relatively large nominal diameter and in its configuration for wheel rims of relatively small nominal diameter by continuous lines and by dashed and dotted lines respectively.

According to the fourth embodiment shown in FIGS. 13 to 16, and according to a first (FIGS. 17 to 19) and a second (FIGS. 20 to 22) variant of the fourth embodiment, the tool parts 20 and 22 are mounted idle on the shank 2 by the respective hubs 200 and 220.

Along the mutually contacting edges of said hubs 200 and 220 there are provided two recesses 50 located on one and the other side of a milled slot 52 provided in the shank 2.

In FIGS. 13 to 16 the means for adjusting the tool parts 20 and 22 comprise two holed lugs 54 which are fixed to one hub 200 and to the other 220 at said recesses 50, and each carrying an idle ball 56 with a threaded through hole.

The threads of the holes are opposite-handed, with said threads there engaging the opposite-handed threads of a threaded rod 58 positioned tangential to the hubs 200 and 220.

Threaded rod 58 is also provided with a central knurled operating wheel 580 the rear portion of which is partly inserted into said slot 52.

Figure 17:
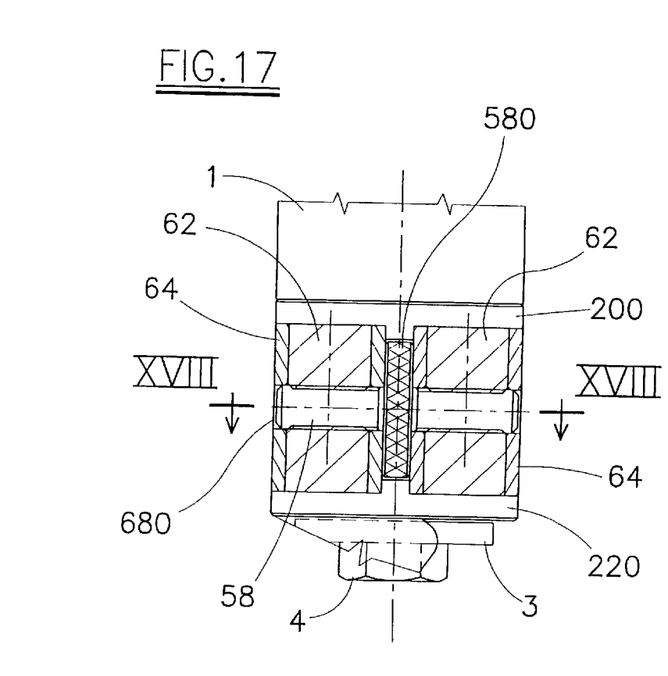
FIG. 17 is a view similar to FIG. 14, showing a variant of the embodiment shown in FIG. 16.
Figure 18:
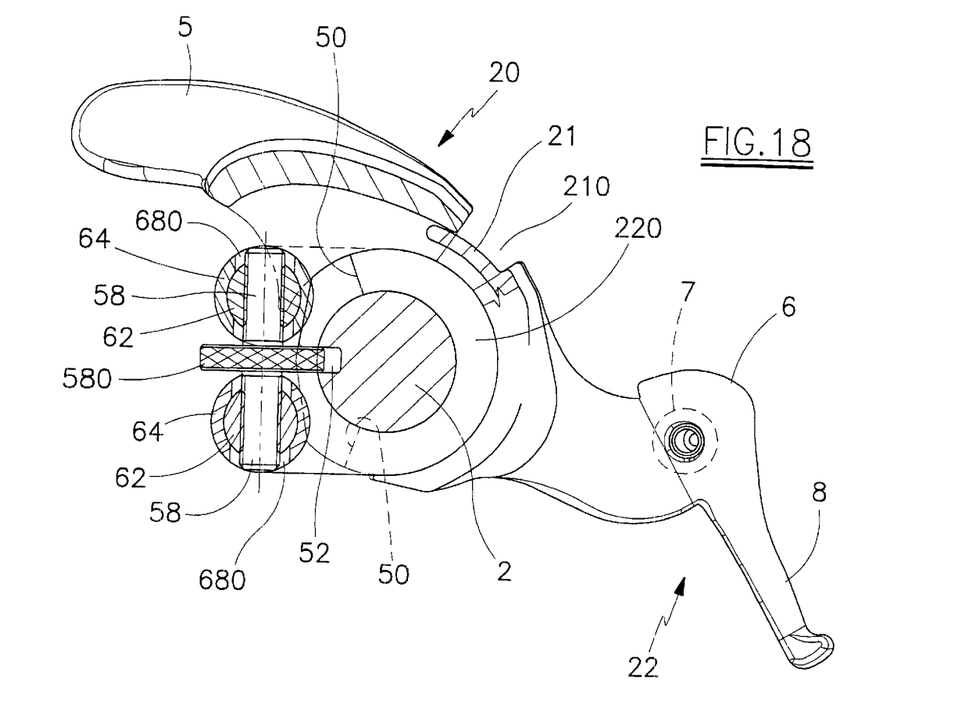
FIG. 18 is a section on the line XVIII—XVIII of FIG. 17, showing the tool in the configuration suitable for wheel rims of relatively large nominal diameter.
Figure 19:
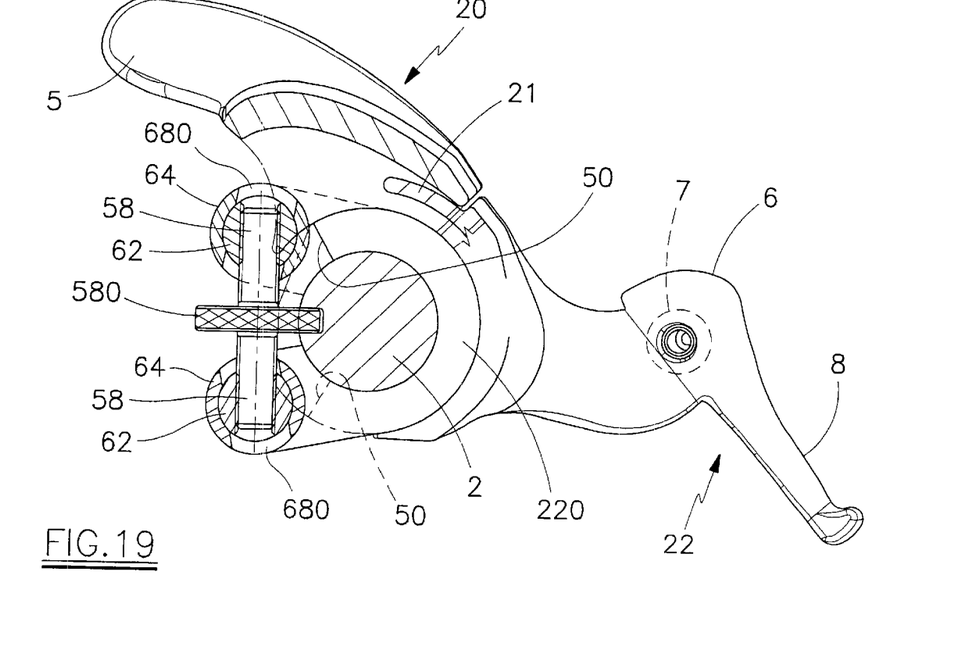
FIG. 19 is a view similar to FIG. 18, showing the tool in the configuration suitable for wheel rims of relatively small nominal diameter.

In the variant of FIGS. 17 to 19, the opposite-handed threaded ends of said rod 58 are engaged with the threads of two threaded diametrical through holes provided in the central part of two cylinders 62.

Cylinders 62 are mounted idle within respective sleeves 64 fixed parallel to the hubs 200 and 220, which are disposed on one and the other side of the milled slot 52 parallel to the hubs 200 and 220, to straddle the horizontal plane of contact of the hubs, and present suitable lateral slots 680 to enable the threaded rod 58 to rotate.

Figure 20:
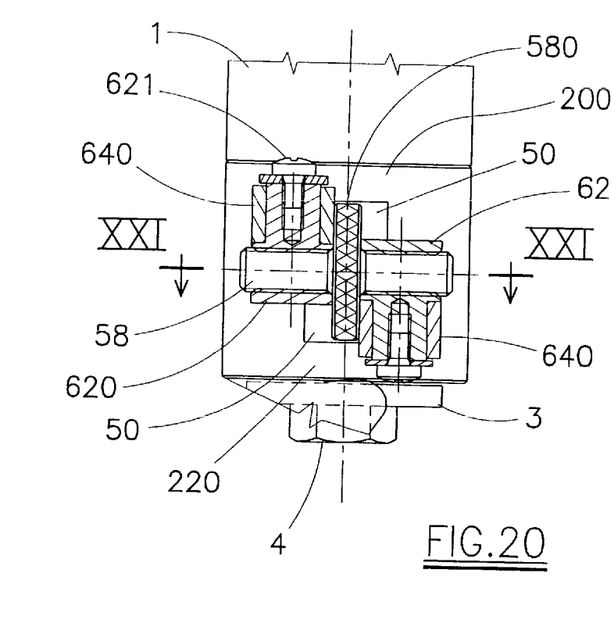
FIG. 20 is a view similar to FIG. 17, showing a further variant.
Figure 21:
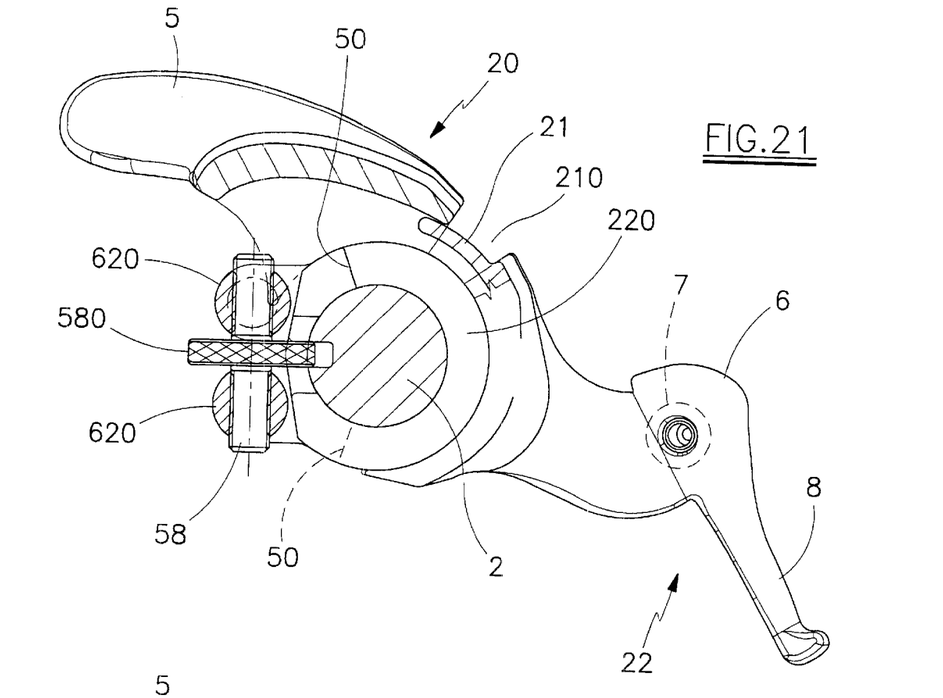
FIG. 21 is a section on the line XXI—XXI of FIG. 17 showing the tool in the configuration suitable for wheel rims of relatively large nominal diameter.
Figure 22:
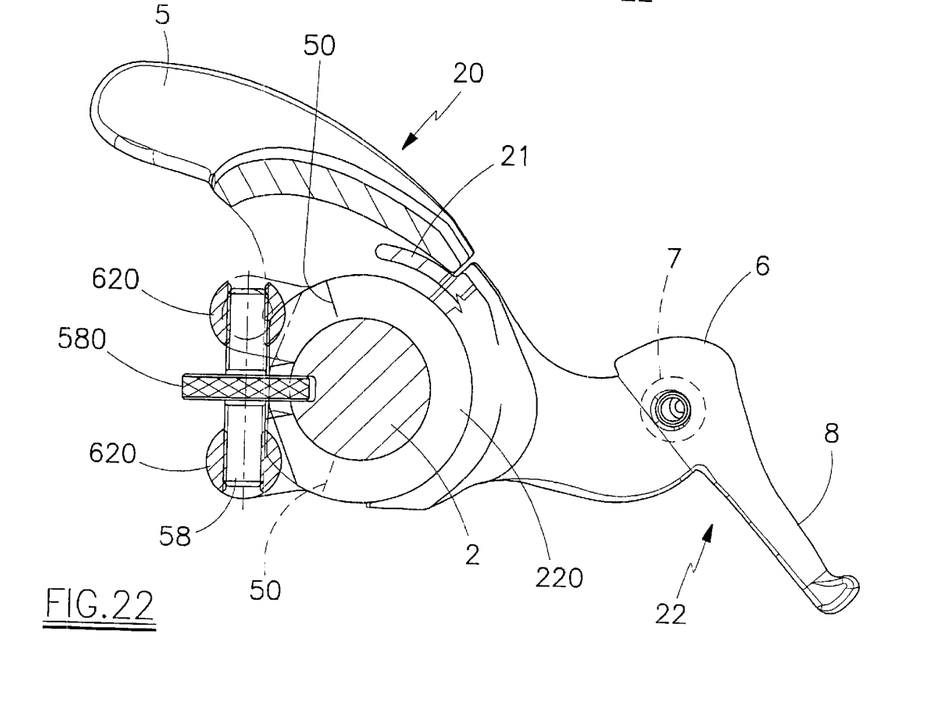
FIG. 22 is a view similar to FIG. 21, showing the tool in the configuration suitable for wheel rims of relatively small nominal diameter.

Finally, in the variant of FIGS. 20 to 22, two sleeves 640 situated on one side and the other of the hub plane of contact are fixed to the hubs 200 and 220.

With each sleeve 640 there is associated a cylinder 620 having two portions of different outer diameter (FIG. 24), of which that of lesser diameter is contained within the respective sleeve 640 and retained there by an end screw 621, and the other presents a through diametrical threaded hole with which there engages the respective end part of the control screw 58.

The operation of the aforedescribed fourth embodiment and of its two variants is apparent from that shown in the respective figures and from the heretofore described.

The merits and advantages of the invention are clear from the aforegoing and from an examination of the figures.

What is claimed is:

1. A tool for mounting and removing tires onto and from respective wheel rims comprising:

a profiled body mounted on a cylindrical shank provided at the end of a tool holder bar associated with a tire removal machine, said profiled body having two active portions comprising a blade and a head;

wherein the blade and the head extend from two parts comprising coaxial hubs, both of which coaxial hubs are mounted on the cylindrical shank of the tool holder bar and irremovably coupled together such that their mutual orientation can be adjusted, and wherein at least one of the hubs is provided with means for torsionally locking the hub to the shank.

2. The tool according to claim 1 wherein each of said hubs comprises a first circular cylindrical portion from which there rises a second portion consisting of a cylindrical segment which extends through less than 180°;

wherein one of the hubs is associated, when in an inverted portion, with the other hub such that the respective second portions mutually copenetrate to allow the two hubs the ability to mutually rotate; and means for torsionally locking the two hubs together, said means located between the two hubs.

3. The tool according to claim 2 wherein the means for torsionally locking the two hubs together comprises a threaded rod provided with an end operating knob which is screwed into a threaded diametrical hole provided through the cylindrical shank on which the hubs are mounted, said threaded rod carrying fixed thereon two identical cones, the vertices of the cones being oriented towards the shank and the outer surfaces of the cones contacting the sides of the second portions of the hubs.

4. The tool according to claim 2 wherein the means for torsionally locking together the two hubs comprises a spindle provided with an end operating knob which is rotatably mounted but axially locked in a diametrical hole provided through the cylindrical shank on which the hubs are mounted, the spindle presenting two identical plugs offset by 90° which are inserted as an exact fit between the sides of the second portions of the hubs.

5. The tool according to claim 2 wherein the means for torsionally locking together the two hubs comprises a pair of matching frontal teeth provided along the mutually facing edges of the hubs.

6. The tool according to claim 5 wherein a second pair of matching frontal teeth is provided between the upper hub and the base of the cylindrical shank.

7. The tool according to claim 2 wherein the means for torsionally locking together the two hubs comprises a rotatably threaded control rod which is axially immovable relative to the shank and which control rod presents two threaded portions with opposite-handed threads engaged in two lungs which branch from the hubs.

8. The tool according to claim 7 wherein the threaded rod is made axially immovable by a knurled central operating wheel wherein the portion of the operating wheel facing the shank is inserted between the sides of the second portions of the hubs and is contained in a slot in the shank.

9. The tool according to claim 7 wherein articulation devices in the form of a ball joint are provided between the threaded portions of the rod and the lugs.

10. The tool according to claim 9 wherein the articulation devices each consist of a cylindrical joint.

\* \* \* \* \*